UNITED STATES PATENT OFFICE.

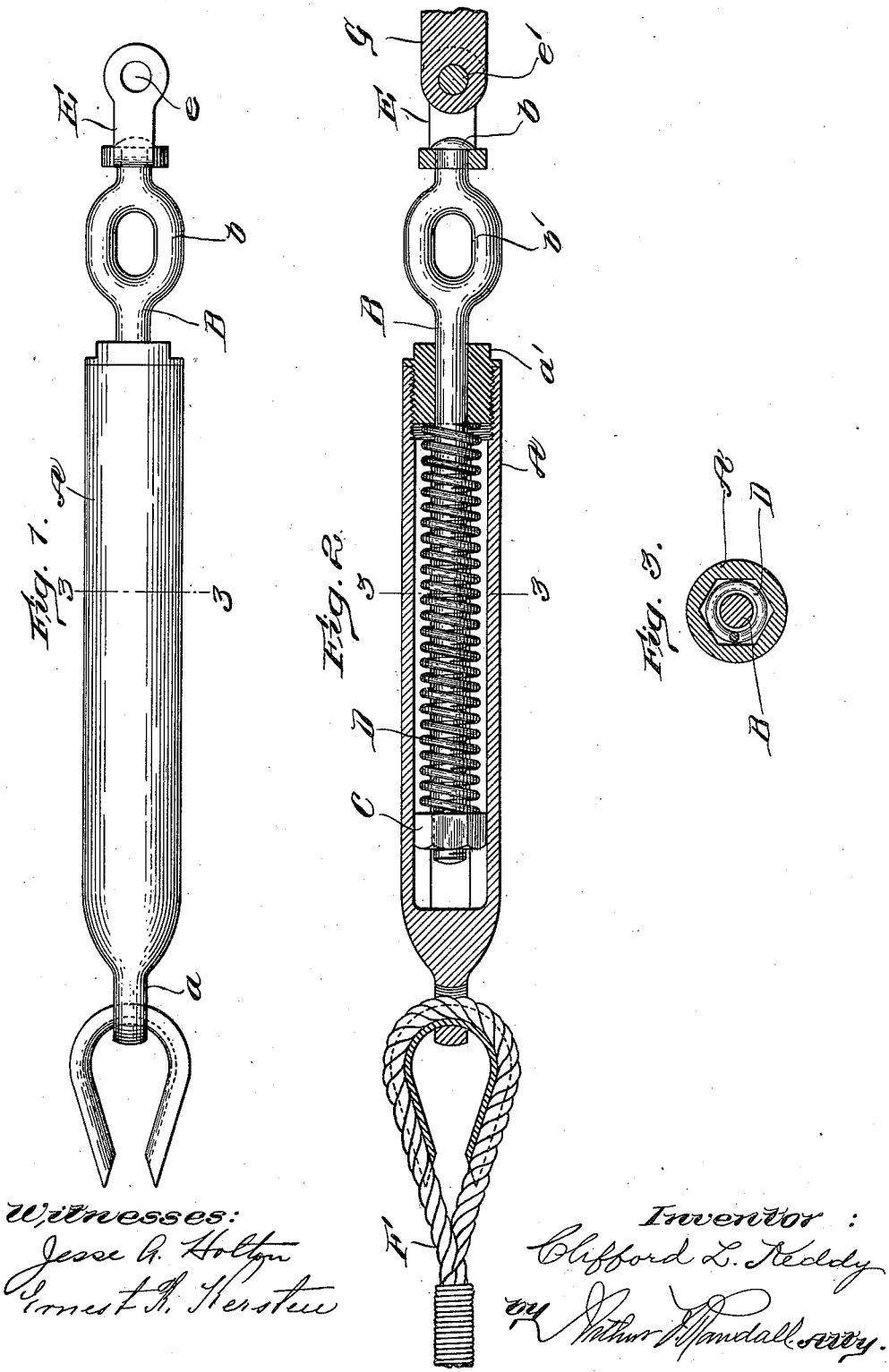

CLIFFORD L. KEDDY, OF LYNN, MASSACHUSETTS.

ELASTIC TURNBUCKLE.

1,006,950.     Specification of Letters Patent.     Patented Oct. 24, 1911.

Application filed June 6, 1911. Serial No. 631,636.

*To all whom it may concern:*

Be it known that I, CLIFFORD L. KEDDY, a subject of the King of Great Britain, and resident of Lynn, in the county of Essex and State of Massachusetts, have invented certain new and useful Improvements in Elastic Turnbuckles, of which the following is a specification.

My invention relates to turnbuckles and has for its object to provide an elastic turnbuckle of simple, inexpensive and strong construction.

My improved turnbuckle comprises a hollow tube into which extends a rod on which is mounted a threaded nut whose threads engage threads provided on one of said parts. The nut is connected with the other of said parts so that it cannot rotate relatively thereto but can move longitudinally thereof, while a spring acting at one end on the nut and at its opposite end upon one of said parts yieldingly holds the tube and rod against separating movement. The tube and rod are provided with means by which one of said parts can be attached to one of the two elements to be connected by the turnbuckle and the other with the other element with provision for relative rotary movement of the rod and tube to shift the nut and vary the holding effect of the spring. That is, by rotating the tube and rod relatively, the nut can be adjusted to vary the length of the turnbuckle and its elasticity according to the requirements of the situation where it is used.

A feature of my invention in its best form consists in arranging the spring with relation to the tube and rod so that the closing of the coils of the spring acts as a positive stop to limit the stretch of the turnbuckle, and so that by relative rotary adjustment of said parts the spring may be fully compressed and its coils closed so as to provide a rigid non-elastic turnbuckle connection when desired.

In the accompanying drawings Figure 1 is a side elevation of my improved turnbuckle; Fig. 2 is a central longitudinal sectional view of the turnbuckle shown in Fig. 1; and Fig. 3 is a section on line 3—3 of Figs. 1 and 2.

Having reference to the drawings A is the tubular member and B the rod, C the nut, D the spring and E a yoke loosely swiveled on the outer end of rod B behind an enlargement or head *b* formed on said outer end. One end of the tubular member A is made with an eye *a* for attachment to one of the two elements shown at F which the turnbuckle connects, while the opposite end of said tubular member A is closed by a threaded plug *a′* screwed into the end of tubular member A, said end being interiorly threaded to receive said nut. The plug *a′* is made with a central aperture through which the rod B extends, as herein shown, the part of rod B within member A is screw threaded and has mounted upon it the nut C between which and plug *a′* is arranged the spring D, said spring acting to yieldingly hold members A and B against separating movement and to positively limit the extent of separating movement by the closing of the coils of said spring.

As shown in Fig. 3, the interior of tubular member A is non-circular in cross-section, being herein shown as hexagonal to fit the shape of the exterior of nut C so that said nut is locked against rotating relatively to member A but can move longitudinally thereof when rod B is rotated in either direction.

The outer end of rod B is formed with a sock *b′* for a wrench by means of which the rod can be rotated relatively to member A and yoke E to adjust nut C to vary the elasticity or length of the turnbuckle or to close the coils of spring D. The legs of yoke E are formed with apertures *e* to receive a bolt *e′* by means of which the yoke is secured to an eye-bolt or other anchorage G which constitutes the other of the two elements that are connected by the turnbuckle.

My improved turnbuckle above described is useful in many situations but it is particularly adapted for use as part of the stay or shroud of a vessel's mast. Heretofore stays and shrouds for masts have been so constructed that they were unyielding and non-elastic under strain and consequently injurious strains and shocks would be brought to bear upon the mast supporting rigging when the mast was subjected to lateral strains due to sudden squalls or to movements of the vessel. With one of my improved turnbuckles forming part of each stay and shroud of the vessel, said parts will be elastic or yielding, to a limited extent, under the lateral strain of the mast, the turnbuckle at one side of the mast giving slack under strain from the mast in one direction, while the turnbuckle or turnbuckles on the other side of the mast will take up the slack on that side. Constructed as herein shown the elasticity of the turnbuckle may be regulated by adjusting the rod B so that when the stay or shroud is subjected to unusual strain, the closing of the coils of spring D will limit the stretch or elasticity of the stay or shroud.

A particularly advantageous feature of the turnbuckle constructed as above is that the spring is completely inclosed and protected by the tubular member A, whose interior chamber is closed so that water cannot enter and collect therein to the injury of the spring.

What I claim is:

1. An elastic turnbuckle comprising a tubular member; a rod extending into said tubular member; a nut within the tubular member having threaded engagement with one of said parts and connected with the other of said parts so that it is locked against rotary movement relatively thereto but is free to move longitudinally thereof; a spring acting through the nut to yieldingly hold the tubular member and rod against movement apart; and means for attaching the outer end of the rod and the opposite end of the tubular member to the two elements that are to be connected by the turnbuckle, with provision for relative rotation of the rod and tubular member to operate the nut.

2. An elastic turnbuckle comprising a tubular member having an interior which is non-circular in cross-section; a nut within the tubular member shaped exteriorly to fit the interior of said member; a threaded rod extending into the tubular member on which the nut is mounted; a spring within the tubular member confined between the nut and one end of said member so as to yieldingly hold the rod and tubular member against separating movement, and means upon the outer end of the rod and the opposite end of the tubular member for attaching the turnbuckle to the two elements the latter is to connect.

3. An elastic turnbuckle comprising a tubular member having an interior which is non-circular in cross-section; a nut within the tubular member shaped exteriorly to fit the interior of said member; a threaded rod extending into the tubular member on which the nut is mounted; a spring within the tubular member confined between the nut and one end of said member so as to yieldingly hold the rod and tubular member against separating movement; a yoke swiveled upon the outer end of the rod for attachment to one of the two elements which the turnbuckle is to connect, and means at the opposite end of the tubular member for attachment to the other of said elements.

4. An elastic turnbuckle comprising a tubular member having an interior which is non-circular in cross-section; a nut within the tubular member shaped exteriorly to fit the interior of said member; a threaded rod extending into the tubular member on which the nut is mounted; a spring within the tubular member confined between the nut and one end of said member so as to yieldingly hold the rod and tubular member against separating movement; a yoke swiveled upon the outer end of the rod for attachment to one of the two elements which the turnbuckle is to connect; a wrench socket formed in the outer portion of the rod between the yoke and tubular member, and means at the opposite end of the tubular member for attachment to the other of said elements.

In testimony whereof I have affixed my signature, in presence of two witnesses.

CLIFFORD L. KEDDY.

Witnesses:
 JESSE A. HOLTON,
 ARTHUR F. RANDALL.

---

Copies of this patent may be obtained for five cents each, by addressing the "Commissioner of Patents, Washington, D. C."